United States Patent [19]

Kehl

[11] Patent Number: 5,159,871
[45] Date of Patent: Nov. 3, 1992

[54] CYLINDER-PISTON UNIT HAVING CENTRAL VALVE, IN PARTICULAR FOR VEHICLE BRAKE SYSTEMS

[75] Inventor: Georg Kehl, Stuttgart, Fed. Rep. of Germany

[73] Assignee: Robert Bosch GmbH, Stuttgart, Fed. Rep. of Germany

[21] Appl. No.: 752,550

[22] PCT Filed: Feb. 27, 1990

[86] PCT No.: PCT/DE90/00136
§ 371 Date: Sep. 25, 1991
§ 102(e) Date: Sep. 25, 1991

[87] PCT Pub. No.: WO90/11919
PCT Pub. Date: Oct. 18, 1990

[30] Foreign Application Priority Data

Apr. 12, 1989 [DE] Fed. Rep. of Germany ....... 3911911

[51] Int. Cl.$^5$ ............................... F15B 11/08
[52] U.S. Cl. .......................... 91/422; 60/587; 60/589; 60/592; 403/326
[58] Field of Search ............. 60/572, 586-587, 60/589, 592; 91/422, 222; 403/261, 326; 92/82

[56] References Cited

U.S. PATENT DOCUMENTS 4,405,251 9/1983 Kolchinsky et al. ............... 403/326
4,922,120 5/1990 Becker et al. ........................ 60/562

OTHER PUBLICATIONS

Standard Handbook of Fastening and Joining, McGraw Hill Book Co., 1977, pp. 3-2 and 3-10 to 3-11.

Primary Examiner—Edward K. Look
Assistant Examiner—F. Daniel Lopez
Attorney, Agent, or Firm—Edwin E. Greigg; Ronald E. Greigg

[57] ABSTRACT

A cylinder-piston unit including a central valve having a valve shaft, on which two spring plates with a pre-stressed restoring spring are disposed. One of the spring plates is engaged from behind by a cross-sectional enlargement of the valve shaft which has a valve closing element. The cross-sectional enlargement is formed by a collar of the valve shaft. Another cross-sectional enlargement comprises a sleeve, which is longitudinally displaceably guided on the valve shaft. On the side remote from the restoring spring, the sleeve has an enlarged inner bore, with which the enlarged inner bore complementarily fits over a snap ring that engages the valve shaft. As a result, a form-locking connection is attained between the sleeve and the valve shaft that assumes that a preassembled valve component unit will be held together even if the snap ring breaks.

3 Claims, 1 Drawing Sheet

CYLINDER-PISTON UNIT HAVING CENTRAL VALVE, IN PARTICULAR FOR VEHICLE BRAKE SYSTEMS

BACKGROUND OF THE INVENTION

The invention is based on a cylinder-piston unit having a central valve, as generically defined hereinafter. Such a unit is already known from U.S. Pat. No. 4,550,567, in which the central valve shaft is embodied as a screw, the cylinder head of which reaches behind the spring plate remote from the piston. Toward the piston, the valve shaft is screwed into a valve body carrying the closing element of the central valve, and the actuating spring engages this valve body. In turn, the valve body is longitudinally guided in a piston in a bore that has a flat valve seat on its bottom.

Stringent demands for the functional reliability of such cylinder-piston units having a central valve are made, particularly if the unit is to be used in vehicle brake systems. However, the known unit has the disadvantage that the screw connection between the valve shaft and the valve body is not secured against loosening. As a result, a change in the spacing between the closing element and the valve seat can occur, which disadvantageously causes a change in the closing travel of this valve. As a result, because of a change in the spacing between the spring plates, a change in the tethering arrangement of the restoring spring also ensues. Moreover, the screw connection allows errors in alignment between the valve shaft and the valve body, which disadvantageously change the closing behavior of the central valve.

ADVANTAGES OF THE INVENTION

The piston-cylinder unit according to the invention has the advantage over the prior art that because the sleeve fits over the snap ring, a form-fitting connection between the sleeve and the valve shaft is attained, which satisfies very high safety requirements. Even if the snap ring breaks, the connection cannot come undone, because the snap ring cannot escape from the groove of the valve shaft. The action of the actuating spring upon the valve shaft is therefore reliably maintained. Moreover, no change in the valve closing travel and in the tethering arrangement of the restoring spring can occur. In addition, the material connection between the valve closing element and the valve shaft makes for great safety against disconnection of these two components having special relevance to safety. Finally, it is advantageous that the individual parts comprising the spring plate, springs, valve shaft and closing element, sleeve and snap ring, form a component unit that can be pre-assembled independently of the piston and tested before it is introduced into the cylinder.

By the provisions recited herein, advantageous further features of and improvements to the piston-cylinder unit disclosed are possible.

The provision of dimensioning of the valve closing element in view of the size of the inside bore of the sleeve allows the closing element to be joined to the valve shaft in a single joining process, which happens before the mounting of the individual parts (spring plate, springs) that are to be lined up on the valve shaft. The quality of the connection can therefore be assured better than in the case of a valve shaft having pre-mounted components.

A further feature is advantageous in the sense that the embodiment of the valve seat, in the closing process of the central valve, effects centering of the closing element, the shaft of which, by the shaping of the collar, can compensate for alignment errors without thereby reducing the size of the contact surface area of the spring plate remote from the piston on the valve shaft.

DRAWING

An exemplary embodiment of the invention is shown in the drawing and described in further detail in the ensuing description. Shown are:

FIG. 1 illustrates a cross-sectional view of a cylinder-piston unit having a central valve, and FIG. 2 illustrates an enlarged cross-sectional view of the central valve as a pre-assembled component unit, on a different scale from FIG. 1.

DESCRIPTION OF THE EXEMPLARY EMBODIMENT

Figure 1:
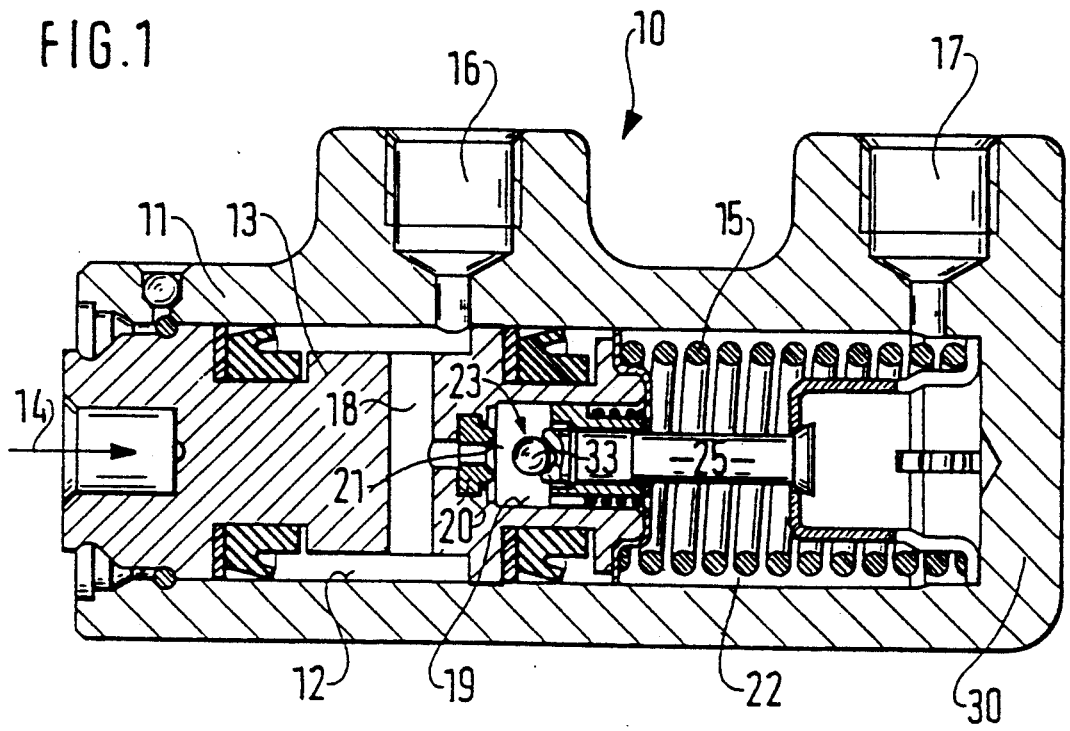

The cylinder-piston unit 10 shown in the drawing is used in a traction control system with braking intervention in a motor vehicle. The arrangement 10 has a cylinder 11, in the bore 12 of which a plunger piston 13 is disposed (FIG. 1). By the action of an actuating device, not shown, the piston 13 can be displaced in the cylinder 11 in the direction of the arrow 14, counter to the force of a restoring spring 15. The cylinder 11 is equipped with a connecting piece 16 for the connection of a line, not shown, coming from the master brake cylinder of the vehicle. A second connecting piece 17 for a line, again not shown, leading to the wheel brake cylinder is also provided. To transmit the brake pressure fed by the master brake cylinder to the wheel brake cylinder, the plunger piston 13 has a passage 18 that extends from a cylindrical groove in the piston and which ends at the bottom of a piston bore 19 at a valve seat 20 having a hollow-conical seat face 21. Cooperating with the plunger piston 13 is a central valve 23 disposed coaxially in the chamber 22 of the cylinder 11 toward the restoring spring.

Figure 2:
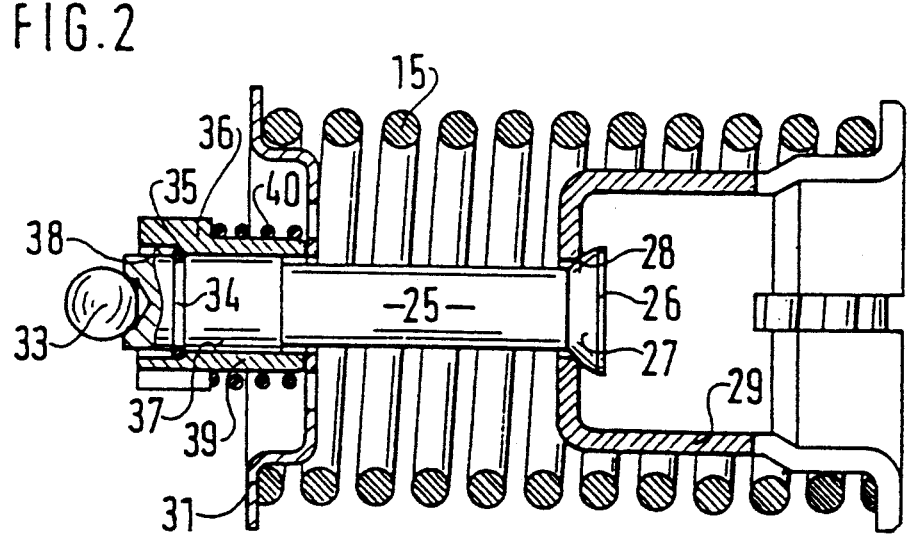

The central valve 23 has a circular-cylindrical valve shaft 25, which is provided with a collar 26 on one end portion (FIG. 2). This collar 26 has a seat face 27 embodied as a spherical zone. A counterpart face 28, embodied in complementary fashion, of a spring plate 29 is penetrated by the valve shaft 25 and associated with the support face 27. The spring plate 29 is supported on the bottom 30 of the cylinder 11, under the influence of the restoring spring 15 embodied as a cylindrical compression spring. A second spring plate 31, which in use seats on the inner end of the plunger piston 13, is also mounted on the valve shaft 25. This spring plate 31 is likewise subject to the influence of the restoring spring 15 which forces the second spring plate 31 against the inner end of the plunger piston 13.

On its end portion remote from the collar 26, the valve shaft 25 has a ball 33, as a closing element for the central valve 23. The ball 33 has a smaller diameter than the valve shaft 25 and is materially joined to it by welding. Near the ball 33, the valve shaft 25 has an annular groove 34 for receiving a snap ring 35. A sleeve 36 having a complimentarily embodied inner bore 37 is also guided on the valve shaft 25. Toward the piston, the sleeve 36 has a portion 38 of its inner bore 37 of enlarged diameter, by which it complimentarily fits over the snap ring 35 engages the inside of the groove 34. Toward the spring plate 31, the sleeve 36 is provided with a portion 39 of reduced diameter. Guided on it is an actuating spring 40, embodied as a cylindrical compression spring, which engages the sleeve 36 at one end and the spring plate 31 at the other.

When the component unit shown in FIG. 2 is assembled, the procedure involves the following steps:

The spring plate 29 is slipped onto the valve shaft 25 until it strikes the collar 26. Next, the restoring spring 15 is centered on the spring plate 29, and the spring plate 31 is disposed on the valve shaft 25. As a result of compression of the restoring spring 15, the valve shaft 25 is released by the spring plate 31 far enough that the sleeve 36, with the actuating spring 40 mounted on it, can be slipped onto the valve shaft 25 until the groove 34 in the valve shaft is exposed. Next, the snap ring 35 is placed in the groove 34, and the restoring spring 15 is relaxed. The sleeve 36 slips longitudinally onto the valve shaft then fits over the snap ring 35, by the enlarged portion 38 of its inner bore 37. The snap ring 35 secure the valve assembly together and is protected by the thus-produced form-fitting engagement against escaping from its groove 34. The sleeve 36, supported on the snap ring 35, and the collar 26 form terminal cross-sectional enlargements of the valve shaft 25 for engagement of the spring plates 29 and 31, thereby attaining a tethering arrangement of the restoring spring 15.

This component unit, mounted and introduced into the cylinder 11, has the following function, in cooperation with the piston 13:

If the traction control system comes into operation, the plunger piston 13 in the cylinder 11 is displaced in the direction of the arrow 14 counter to the force of the restoring spring 15. In this process, because of the action of the actuating spring 40 as a result of the engagement of the collar 26 with the spring plate 29, the valve shaft 25 of the centering valve 23 is first retained in its position. In the course of the displacement travel of the piston 13, the valve seat 20 meets the ball 33 of the valve shaft 25. In this process the seat face 21 centers the ball 33 of the valve shaft 25, which is guided with its sleeve 36 in the piston bore 19 with play. The slight shifting of the valve shaft 25 effected as a result is compensated for by a relative motion of the collar 26 on the spring plate 29, yet the support face 26 of the collar does not lose its contact with the counterpart face 28 of the spring plate. With the central valve 23 now closed, the passage 18 of the plunger piston 13 is blocked, so that as a result of the further motion of the piston, brake fluid is positively displaced out of the cylinder chamber 22, and brake pressure can be generated in the wheel brake cylinder. As the piston motion continues, the valve shaft 25 is then longitudinally displaced relative to the spring plate 23, and the collar 26 lifts away from the spring plate 29. In the return stroke of the plunger piston 13, the collar 26 of the valve shaft 25 strikes the spring plate 29 again and is centered by the engagement of its support face 27 with the counterpart face 28 of the spring plate. Finally, the passage 18 of the piston 13 is opened by the lifting of the ball 33 from the seat face 21 of the valve seat 20, and brake-pressure-generating action is cancelled. The same pressure conditions now prevail between the passage 18 of the plunger piston 13 and the cylinder chamber 21.

The foregoing relates to a preferred exemplary embodiment of the invention, it being understood that other variants and embodiments thereof are possible within the spirit and scope of the invention, the latter being defined by the appended claims.

I claim:

1. A cylinder piston, with a central valve for a vehicle brake system comprising:
   a cylinder (11), which is closed on one end and open on one end,
   a movable piston (13) disposed in said open end,
   a valve seat (20) on said piston,
   said central valve including first and second spring plates (29, 31), a restoring spring (15) between said first and second spring plates, a valve shaft (25) that extends axially through said first and second spring plates, said valve shaft including an enlarged end portion (26) which seats on said first spring plate and a smaller end portion that includes a cylindrical groove (34) therein,
   a sleeve (36) that surrounds said smaller end portion and positioned on the piston side of said second spring plate for a longitudinal displacement relative thereto,
   said sleeve (36) includes an enlarged inner bore end, and a smaller diameter outer end,
   a spring (40) surrounding said smaller diameter end of said sleeve between said second spring plate and an enlarged snap ring (35) in said groove (34) of said valve shaft,
   said snap ring (35) surrounds said valve shaft end and fits within said larger diameter bore of said sleeve to secure said central valve together,
   a valve closing element on an end of said valve shaft toward said piston, and
   said piston engages said second spring plate in an open non-braking position and additionally engages said valve ball during a braking operation.

2. A cylinder-piston unit as defined in claim 1, in which the valve closing element is embodied as a ball (33) that is fixed to the valve shaft (25), the ball having a smaller diameter than the enlarged inner bore (37) of the sleeve (36).

3. A cylinder-piston unit as defined in claim 2, in which the valve seat (20) of the piston (13) associated with the valve closing ball (33) has a hollow conical form, while the enlarged end portion of said valve shaft (25) remote from the piston is embodied as a collar (26) defined in the form of a spherical zone, which is engaged by the associated first spring plate (29) with a complimentarily embodied counterpart surface (28) on the first spring plate (29).

* * * * *